(12) United States Patent
Podilchuk

(10) Patent No.: US 8,027,549 B2
(45) Date of Patent: Sep. 27, 2011

(54) SYSTEM AND METHOD FOR SEARCHING A MULTIMEDIA DATABASE USING A PICTORIAL LANGUAGE

(75) Inventor: Christine Podilchuk, Warren, NJ (US)

(73) Assignee: D&S Consultants, Inc., Eatontown, NJ (US)

( * ) Notice: Subject to any disclaimer, the term of this patent is extended or adjusted under 35 U.S.C. 154(b) by 1254 days.

(21) Appl. No.: 11/670,725

(22) Filed: Feb. 2, 2007

(65) Prior Publication Data

US 2007/0286528 A1    Dec. 13, 2007

Related U.S. Application Data

(60) Provisional application No. 60/812,646, filed on Jun. 12, 2006, provisional application No. 60/861,686, filed on Nov. 29, 2006, provisional application No. 60/861,685, filed on Nov. 29, 2006, provisional application No. 60/861,932, filed on Nov. 30, 2006, provisional application No. 60/873,179, filed on Dec. 6, 2006.

(51) Int. Cl.
*G06K 9/00* (2006.01)
(52) U.S. Cl. ......... 382/305; 382/159; 382/181; 382/209
(58) Field of Classification Search .......... 382/159–160, 382/181–209, 305–307
See application file for complete search history.

(56) References Cited

U.S. PATENT DOCUMENTS

| | | | |
|---|---|---|---|
| 4,503,557 A | 3/1985 | Maeda | |
| 4,901,362 A | 2/1990 | Terzian | |
| 5,459,739 A | 10/1995 | Handley | |
| 5,751,286 A | 5/1998 | Barber | |
| 5,757,959 A | 5/1998 | Lopresti | |
| 5,761,538 A | 6/1998 | Hull | |
| 5,832,474 A | 11/1998 | Lopresti et al. | |
| 5,875,446 A | 2/1999 | Brown | |
| 5,940,778 A | 8/1999 | Marfurt | |
| 6,104,835 A | 8/2000 | Han | |
| 6,161,130 A | 12/2000 | Horvitz | |
| 6,295,371 B1 | 9/2001 | Rucklidge | |
| 6,581,034 B1 | 6/2003 | Choi | |
| 6,616,704 B1 | 9/2003 | Birman | |

(Continued)

FOREIGN PATENT DOCUMENTS

EP    0949580    2/2001

OTHER PUBLICATIONS

Marco, Bertini, Alberto Del Bimbo, Walter Nunziati, Video Clip Matching Using MPEG-7 Descriptors and Edit Distance, Image and Video Retrieval 5th International conference , CIVR 2006, Tempe AZ, Jul. 13-15, 2006, Lecture Notes in Computer Science, 2006, vol. 4071/2006, pp. 133-142.*

(Continued)

*Primary Examiner* — Wesley Tucker
(74) *Attorney, Agent, or Firm* — Dennis M. Carleton; Fox Rothschild LLP

(57) ABSTRACT

A system and method for searching multimedia databases using a pictorial language, input via an iconic interface and making use of trained ontologies, i.e., trained data models. An iconic graphic user interface (GUI) allows a user to specify a pictorial query that may include one or more one or more key-images and optional text input. Similarities between the query key-images and images in a multimedia database based on a pictorial edit distance are used to select the images that are the closest match to the query. The result images are returned to the user in order of their relevance to the query.

12 Claims, 2 Drawing Sheets

U.S. PATENT DOCUMENTS

| | | |
|---|---|---|
| 6,633,857 B1 | 10/2003 | Tipping |
| 6,741,725 B2 | 5/2004 | Astle |
| 6,898,469 B2 | 5/2005 | Bickford |
| 6,915,009 B2 | 7/2005 | Foote |
| 6,944,602 B2 | 9/2005 | Cristianin |
| 6,990,217 B1 | 1/2006 | Moghaddam |
| 7,054,847 B2 | 5/2006 | Hartman |
| 2002/0078043 A1* | 6/2002 | Pass et al. .................. 707/6 |
| 2002/0097914 A1* | 7/2002 | Yaung ...................... 382/225 |
| 2005/0129290 A1 | 6/2005 | Lo |
| 2005/0147302 A1 | 7/2005 | Leung |
| 2006/0093190 A1* | 5/2006 | Cheng et al. ............. 382/115 |
| 2006/0107823 A1 | 5/2006 | Platt |
| 2006/0112068 A1 | 5/2006 | Zhang |
| 2006/0251339 A1 | 11/2006 | Gokturk |

OTHER PUBLICATIONS

Podilchuk, "A New Face Recognition Algorithm Using Bijective Mappings" 2005 IEEE Comp Soc Conf on Comp Vision and Pattern Recogn, Jun. 20-26, 2005, vol. 3, pp. 165 US.

Hsuan Shih, Lee, "A Fast Algorithm for Computing the Transitive Closure [etc]," IEEE Proc of the Int ICSC Cong on Comp Intel Meth and Appl, pub. 1999 (Jun. 22-25, 1999) US.

Bhatnagar et al "Syntactic Pattern Recognition of HRR Signatures," SPIE Proc. v 4053, 190, pp. 452-466, Soc of Photo-Opt Instrum Engineers, Bellingham WA (2000).

Oommenn et al "On Using Parametric String Databases and Vector Quantization [etc]," IEEE Proc. Int. Conf. on Sys, Man and Cyber, v 1, p. 511-517 IEEE, Piscataway NJ (1997).

Chen, "Fast Schemes for Computing Similarities Between Gaussian HMMs [etc]" EURASIP Jour on Appl Sign Pro (EURASIP J. Appl. Sig Pro v 2005, n13, Aug. 1, 2005 p. 1984-1993 US.

Asano, "Efficient Algorithms for Optimization-Based Image Segmentation" (NDN-174-0695-5802-4) IEEE Int Jour of Comp Geo & App, v11, No. 2, 2001 p. 145-166 US.

Menico, "Faster String Searches (Boyer-Moore Algorithm)" Dr. Dobb's Jour of Software Tools, v14 n7 pub Jul. 1989 p. 74-78 (US).

* cited by examiner

*Image A* OR *Image B*

*Image A* AND *Image B*

*Image A* AND NOT *Image B*

SYSTEM AND METHOD FOR SEARCHING A MULTIMEDIA DATABASE USING A PICTORIAL LANGUAGE

CROSS REFERENCE TO RELATED APPLICATIONS

This application is related to, and claims priority from, the following: U.S. provisional patent application No. 60/861,686 filed on Nov. 29, 2006 by C. Podilchuk entitled "Method for multimedia information retrieval using a combination of text and exemplar images in the query," U.S. provisional patent application No. 60/861,685 filed on Nov. 29, 2006 by C. Podilchuk entitled "New object/target recognition algorithm based on edit distances of images," U.S. provisional patent application No. 60/861,932 filed on Nov. 30, 2006, by C. Podilchuk entitled "New learning machine based on the similarity inverse matrix (SIM)," U.S. provisional patent application No. 60/873,179 filed on Dec. 6, 2006 by C. Podilchuk entitled "Fast search paradigm of large databases using similarity or distance measures" and U.S. provisional patent No. 60/814,611 filed by C. Podilchuk on Jun. 16, 2006 entitled "Target tracking using adaptive target updates and occlusion detection and recovery," the contents of all of which are hereby incorporated by reference.

FIELD OF THE INVENTION

The present invention relates to systems and methods for searching multimedia databases, and more particularly, to systems and methods for searching multimedia databases using a pictorial language via an iconic interface.

BACKGROUND OF THE INVENTION

A conventional Internet search engine is a document or file retrieval system designed to help find information stored in one or more databases that are typically part of one or more websites comprising the world-wide network commonly known as the Internet.

Search engines, such as, for example, the Google™ engine provide by Google, Inc. of Mountain View, Calif. ("Google™") and the Yahoo!™ engine provided by Yahoo! of Sunnyvale, Calif. ("Yahoo!™") are used by millions of people each day to search for information on the Internet. Such search engines enable a user to query databases, web sites, web pages and other data sources comprising the Internet using one or more keywords that may be combined into a search string using Boolean logic. The search engine returns a list of documents, files and web pages having content that allegedly meets the user's request, i.e., the documents, files, web pages and other data contain the keywords in the combination specified by the search string (among other factors relied upon by the text-based search engine conducting the search). The documents, files and web pages are usually listed in order of the relevance of the results, as determined by some metric of relevance such as, but not limited to, Google™'s well-known "Page" ranking method. The unique resource locator (URL) of each document is also typically displayed. Advertising, or links to advertisers' sites, having content that may be based on the keywords in the search string is also often displayed along side the search results. This form of advertising has become widely used and is a source of enormous revenue for the search engine companies.

As more users gain access to the Internet via high-bandwidth connections, websites that are rich in image content, including video and photographs, are becoming more common and more important. This trend may be seen in the rapid rise in popularity of, for instance, Google™'s YouTube™ website and Yahoo!™'s Flickr™ website. The YouTube™ website features short video clips that are typically homemade and uploaded by registered members of the website. Flickr™ is a website for storing and sharing photographs.

A problem with websites that have image rich content, such as YouTube™ and Flickr™, is that conventional search engines are text based and, therefore, do not and are not able to search actual image content. Both YouTube™ and Flickr™ attempt to solve this problem by having users add text tags and/or text annotations to the images and video, which is not objective search content, but subjective interpretation of the content. The conventional search engines may then do conventional searching on the text that is associated with the image—whether or not the text is appropriate and applicable to the image or video content.

One short coming of the keyword tag approach to searching image databases is that it requires human intervention, i.e., it is based on subjective interpretation of the content of the image or video and not on the actual objective content of the file itself. A second short coming of this search method is that it does not allow searching for an image, i.e., looking for an image that matches, or is similar to, an example image.

The potential importance of being able to search for an image may be illustrated by considering the following scenario: A YouTube™ user sees a clip of a celebrity on a TV show and likes the handbag the celebrity is carrying. The YouTube™ user would like to buy the same model of handbag, and has even downloaded an image of the handbag, but doesn't know where to begin looking. A search on the Internet, for instance, using the key words "Kelly Ripa" and "handbag" turns up hundreds of sites, dozens of which are handbag manufacturers' sites that claim Kelly has been seen wearing their handbags. The problem is that the sites each have dozens of handbags and there is no indication of which site may have the closest match or, better still, which page on which site may have the closest match. And, all of the information presented by the search engine to the YouTube™ user is based on subjective interpretation—what other people believe (or worse yet, what other people want others to believe) is the information that satisfies the crude text search of "Kelly Ripa" and "handbag." Moreover, the YouTube™ user must now manually sort and cull through scores of "hits," usually in the form of URLs or links to websites, all of which collectively contain hundreds of images of handbags on dozens of pages, all in order to hopefully find a match.

What would be more useful to such a user is a system that allows the user to somehow enter into the search engine the actual downloaded image of the handbag (or image obtained from some other source), have the search engine search for matches of that image and automatically deliver "hits"—matching or similar images with links to the Internet source of the images, preferably with a reliable ranking system that indicates how similar each of the images contained in the "hits" is to the example image, with such ranking system being based on the actual objective content of the images and not on subjective interpretation of each such image.

There are a few image search systems which attempt to provide the ability to search for matches to example images using attributes from the images themselves. These methods are called Content Based Image Retrieval (CBIR) methods and have been described in detail in, for instance, U.S. Pat. No. 5,751,286 to Barber, et al., issued on May 12, 1998, entitled "Image query system and method," the contents of which are hereby incorporated by reference. The attributes that have been used in such systems include, but are not limited to, color layout, dominant color, homogeneous texture, edge histogram, shape region, and shape contour. Most CBIR systems allow the user to input qualitative values for parameters such as color, texture and low level shape descriptors. A drawback of such existing systems is that these attributes are frequently not known by users. A further drawback is that ranking images in order of the most likely match in such systems is heavily dependent on the weight given to different attributes, making consistent results difficult to attain. And, again, such a system requires subjective human interpretation.

An image search system that does not rely on user supplied text tags and can consistently find good matches from easily entered data may be of great importance in fields from Internet shopping, to browsing photo and video content, to searching surveillance tapes. Such a system's use would be greatly facilitated by a method of entering search queries that is visual and intuitive.

SUMMARY OF THE INVENTION

Briefly described, the present invention provides a system and method for searching multimedia databases using a pictorial language, input via an iconic interface, and making use of trained ontologies, i.e., trained data models.

In a preferred embodiment, the invention includes an iconic graphic user interface (GUI) that allows a user to specify a pictorial query that may include one or more one or more key-images and optional text input.

The system of this invention then uses a pictorial edit distance between the query key-images and images in a multimedia database to select the images that are the closest match to the query. These result images are then returned to the user in order of their relevance to the query.

These and other features of the invention will be more fully understood by references to the following drawings.

This Summary is neither intended nor should it be construed as being representative of the full extent and scope of the present invention, which these and additional aspects will become more readily apparent from the detailed description, particularly when taken together with the appended drawings.

The appended drawings illustrate exemplary embodiments of the invention and, as such, should not be considered as limiting the scope of the invention that may admit to other equally effective embodiments. It is contemplated that features or steps of one embodiment may beneficially be incorporated in other embodiments without further recitation.

DETAILED DESCRIPTION

The present invention applies to systems and methods of searching a database of images or video using pictorial and/or semantic queries.

In a preferred embodiment, the queries may be parsed into tokens, or sub-images, of general classes of objects such as, but not limited to, faces, people, cars, guns and other objects. The tokens in the query are first checked for proper syntax. In the context of image and video searching, syntax includes the geometric and temporal relationships between the objects in the query. After the tokens are found to have a correct or acceptable syntax, a check may be made of the semantics, i.e., the meaning of the query. In the context of image searching, the meaning may be defined to be the similarities of the sub-images with all other images in the vocabulary. The vocabulary is a set of archetypical images representing the basic objects in the "Pictorial Language." The tokens are similar to keywords in text based queries. The objects may be considered as binary large objects (BloBs), i.e., as a collection of binary data stored as a single entity in a database management system.

A preferred embodiment of the invention will now be described in detail by reference to the accompanying drawings in which, as far as possible, like elements are designated by like numbers.

Although every reasonable attempt is made in the accompanying drawings to represent the various elements of the embodiments in relative scale, it is not always possible to do so with the limitations of two-dimensional paper. Accordingly, in order to properly represent the relationships of various features among each other in the depicted embodiments and to properly demonstrate the invention in a reasonably simplified fashion, it is necessary at times to deviate from absolute scale in the attached drawings. However, one of ordinary skill in the art would fully appreciate and acknowledge any such scale deviations as not limiting the enablement of the disclosed embodiments.

Figure 1:
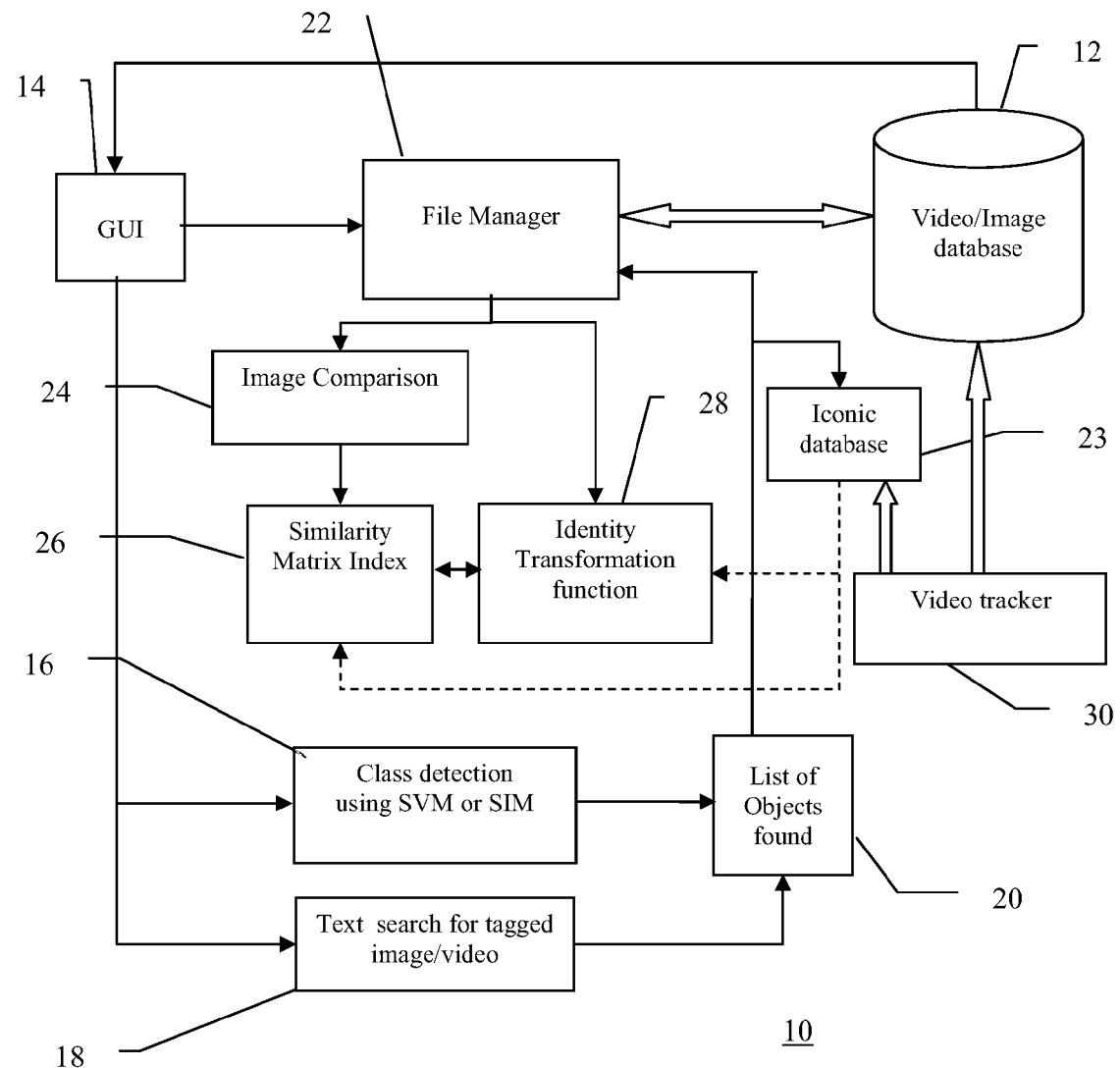
FIG. 1 is a schematic architecture of an exemplary embodiment of a multimedia search system of the present invention.

FIG. 1 is a schematic architecture of an exemplary embodiment of a multimedia search system of the present invention. The Pictorial Language Using Trained Ontologies system, or PLUTO system 10, includes a multimedia database 12, a graphic user interface or GUI 14, a class detection module 16, a text search module 18, an object listing module 20, a file manager 22, an iconic database 23, an image comparison module 24, a similarity matrix module 26, an identification module 28 and a video tracker 30.

The iconic GUI 14 allows the user to interact with the PLUTO system 10. The user may, for instance, "drag-and-drop" images as key-images for specifying particular instances of a person, object, event or other item. The user may also type in keywords for generic information such as, but not limited to, a class of objects. In addition to specific keywords and key-images, the PLUTO system 10 allows the user to specify relationships, such as, but not limited to, Boolean, temporal, and spatial relationships, between the keywords and key-images. In a preferred embodiment, the relationships are interpreted before the query is passed to the next level of processing.

The user may also use the GUI 14 to modify or preprocess the images before initiating the search. In a preferred embodiment, the additional functionalities supported by the GUI 14 may include, but are not limited to, morphing of two or more images, adding or subtracting the effect of ageing on a facial image, "ANDing" images by overlaying one image on another, and the ability to select regions in one or multiple image(s) indicating items that are to be present or absent in the search results. The GUI 14 also allows the user to specify time, geographic locations, or even camera settings for the search. The system may also, or instead extract, this information from the metadata tags attached to the images by the cameras taking the images such as the well known Exchangeable image file format (Eiff) metadata tags. These additional features available via the GUI 14 give the user the flexibility to input complex search queries to the system. After the search is performed, the GUI 14 may also display the results of the search in the order of relevance of the results.

The semantic input of the query is interpreted by the GUI 14 and passed on to the class detection module 16. The class detection module 16 uses the semantic input, i.e., the keyword and the Boolean relationships between keywords to find relevant images using a learned Support vector machines (SVM) or a Similarity Inverse Matrix (SIM) machine. The trained SVM or SIM machine is a trained classifier associated with each of the available keywords that detects objects relevant to the keyword. For instance, a user may want to search images with "face AND car." The SVM or SIM would extract all images containing the two generic classes of faces and cars from the database. The class detection generates a list of objects relevant to the keywords input by the user. The SIM is described in detail in, for instance, co-pending U.S. patent application Ser. No. 11/619,121 filed on Jan. 2, 2007 by C. Podilchuk entitled "System and Method for Machine Learning using a Similarity Inverse Matrix," the contents of which are hereby incorporated by reference.

The search results obtained from the conventional keyword search for tagged images/video are added to the list of objects found by the text search module 18. A rank ordered subset of these image templates are given to the file manager 22 by the object listing module 20 for performing image based search.

The image input from the user is passed from the GUI 14 to the file manager 22. A set of pre-selected images including images corresponding to the subset of objects detected by the class detection module 16 are used by the file manager 22 to compare with the query or key-image. A fast search technique may be employed by the file manager 22 that uses a pre-computed similarity matrix index and the identity transformation function to find the most relevant objects in the database. Such a fast search technique is described in detail, for instance, in co-pending U.S. patent application Ser. No. 11/619,104 filed on Jan. 2, 2007 by C. Podilchuk entitled "System and Method for Rapidly Searching a Database," the contents of which are hereby incorporated by reference.

A similarity matrix is a pre-computed matrix of similarity scores between images using P-edit distances and the identity transformation function is required to map the objects of interest to their corresponding location in the similarity matrix.

Edit distances or Levenshtein distances were first used for string matching in 1965. Similar distance metrics have been used in the Smith-Waterman algorithm for local sequence alignment between two nucleotide or protein sequences. Dynamic Time Warping is used to align speech signals of different length. We apply this idea to image recognition and call it P-edit distance.

The P-edit or Pictorial-edit distance is used to calculate distances between images. The similarity matrix uses a similarity score based on P-edit distances. We obtain a vector field or an image disparity map between a query image (key-image) and a gallery image using a block matching algorithm, as described below. The properties of this mapping are translated into a P-edit distance which is used to compute the similarity score. The P-edit distance is described in detail in co-pending U.S. patent application Ser. No. 11/619,092 filed on Jan. 2, 2007 by C. Podilchuk entitled "System and Method for Comparing Images Using an Edit Distance," the contents of which are incorporated herein by reference.

In a preferred embodiment, to find the pictorial edit distance between an image contained in a database (a gallery image) and a key-image (query image), the gallery image is divided into blocks of pixels. For every block of pixels in the gallery image, a closest match is found in the query image. The substitution function may be equated to the errors in the block matches; the deletion function may be equated to the portion of the probe image not involved in any of the closest matches, and the insertion function may be equated to the portion of the key-image involved in two or more matches. The edit distance from the gallery image to the query image may then be determined as a weighted sum of the insertion, deletion and substitution functions, or some suitable combination thereof.

The block matching may be done by any suitable block matching technique, including, but not limited to, fixed or variable sized block matching that, for instance, looks for matches to within some predetermined threshold. The block matching may be based on either the mean square difference of the pixel values, or the mean absolute difference, or some suitable combination or variant thereof. In a preferred embodiment, the block matching algorithm may be modified by a multiplicative term that compensates for illumination variation between images. The block matching may be attempted over the entire image or it may be confined to a sub-region of the image that may correspond to where the block occurred in the gallery image.

The file manager 22 combines the ranked search results based on the key-image and the keywords input by the user and requests the multimedia database 12 that contains the relevant video and/or images to return the most relevant objects to the user via the GUI 14.

Long video streams containing objects of interest would be hard to search if every frame with the objects presence is used as a template. In a preferred embodiment of the invention, this problem is solved using a video tracker 30 that allows objects in video sequences to be tracked. In this way only a small number of templates need to be retained and searched to allow objects in the video to be identified. These templates may then used to populate the similarity matrix. When a query is made, the file manager 22 finds relevant images from the similarity matrix module 26 and refers the iconic database 23 to select the relevant video streams.

The identification module 28 contains the file locations in the multimedia database 12 of the actual images that are represented by similarity scores in the similarity matrix module 26.

Additional particulars of the method and system for searching multimedia databases using exemplar images are described in detail in, for instance, co-pending U.S. patent application Ser. No. 11/619,133 filed Jan. 2, 2007 by C. Podilchuk entitled "System and Method for Searching Multimedia using Exemplar Images," the contents of which are incorporated herein by reference.

Figure 2A:
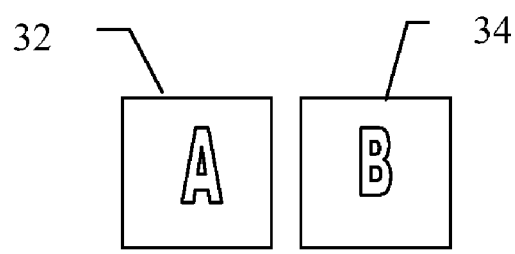
FIG. 2A is a schematic representation of a Boolean OR operation expressed using an iconic graphical user interface.

FIG. 2A is a schematic representation of a Boolean OR operation expressed using an iconic graphical user interface. An icon representing image A 32 and an icon representing an image B 34 are both placed next to each other, but not overlapping, in a query window of the GUI 14. In this way, a pictorial query representing the Boolean OR operation may be specified.

Figure 2B:
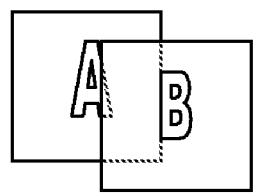
FIG. 2B is a schematic representation of a Boolean AND operation expressed using an iconic graphical user interface.

FIG. 2B is a schematic representation of a Boolean AND operation expressed using an iconic graphical user interface. An icon representing image A 32 and an icon representing an image B 34 are both placed in a query window of the GUI 14, but now part of icon representing image A 32 overlaps with part of icon representing an image B 34. In this way, a pictorial query representing the Boolean AND operation may be specified.

Figure 2C:
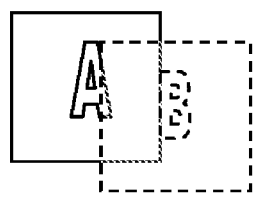
FIG. 2C is a schematic representation of a Boolean AND NOT operation expressed using an iconic graphical user interface.

FIG. 2C is a schematic representation of a Boolean AND NOT operation expressed using an iconic graphical user interface. An icon representing image A 32 and an icon representing an image B 34 are both placed in a query window of the GUI 14, with part of icon representing image A 32 overlapping with part of icon representing an image B 34. In addition, the border of icon representing an image B 34 has been altered. This alteration may be, but is not limited to, a change in thickness, color or type of line representing the border of the icon representing an image B 34. In this way a pictorial query representing the Boolean AND NOT operation may be specified.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. Modifications may readily be devised by those ordinarily skilled in the art without departing from the spirit or scope of the present invention.

What is claimed is:

1. A system for searching a multimedia database, comprising:
   a computer;
   a computer-readable medium having software stored thereon that, when executed by said computer, performs a method including the steps of:
     allowing a user to specify a pictorial query, said pictorial query consisting of one or more key-images moved into a query area defined in a graphical user interface;
     determining a pictorial edit distance between said one or more key-images and a database image; and
     using said pictorial edit distance to select a closest match image from said multimedia database.

2. The system of claim 1 wherein said pictorial query allows the specification of a Boolean relationship between two or more of said key-images.

3. The system of claim 2 wherein an AND relationship between two or more key-images is indicated by placing said two or more key-images in said query area such that said key-images overlap.

4. The system of 2 wherein an OR relationship between two or more key-images is indicated by placing said two or more key-images in said query area such that said key-images do not overlap.

5. The system of 2 wherein an AND NOT relationship between two or more key-images is indicated by modifying an attribute of one or more of said key-images and placing said two or more key images in said query area such that said key-images overlap.

6. The system of claim 5 wherein said modified attribute is a color of a border of said one or more key-images.

7. The system of claim 1 wherein said pictorial query may consist only of a portion of said one or more key-images, said portion being selected by said user.

8. The system of claim 1 wherein said pictorial query may further consist of one or more text search terms having a Boolean relationship.

9. The system of claim 8 wherein said text search terms may be used to select a subset of images from said database for matching with said key-images.

10. The system of claim 1 wherein said method further includes the step of determining the pictorial edit distance between each key-image and all or a subset of images from said database.

11. The system of claim 10 wherein said method further includes the step of applying a similarity inverse matrix to improve the results of the calculation of a pictorial edit distance between said key-images and images from said database.

12. The system of claim 1 wherein said database images are selected from a sequence of video frames using video tracker that allows objects in video sequences to be tracked.

* * * * *